United States Patent [19]
Eccles

[11] Patent Number: 5,938,341
[45] Date of Patent: Aug. 17, 1999

[54] FOIL THRUST BEARING INCLUDING A FOLLOWER SPRING HAVING ROTATED, ELONGATED SPRING TABS

[75] Inventor: Steven R. Eccles, Torrance, Calif.

[73] Assignee: AlliedSignal Inc., Morristown, N.J.

[21] Appl. No.: 09/020,864

[22] Filed: Feb. 9, 1998

[51] Int. Cl.⁶ ..................................................... F16C 17/06
[52] U.S. Cl. ........................................... 384/106; 384/105
[58] Field of Search .................................... 384/106, 105, 384/104, 103

[56] References Cited

U.S. PATENT DOCUMENTS 4,682,900  7/1987  Gu ............................................ 384/106
5,322,371  6/1994  Signoret et al. ......................... 384/106

*Primary Examiner*—Lenard A. Footland
*Attorney, Agent, or Firm*—Robert Desmond, Esq.

[57] ABSTRACT

A follower spring for a foil thrust bearing includes a plate and a plurality of spring tabs extending from the plate. The spring tabs are elongated and offset at angles between approximately 45 degrees and approximately 75 degrees. The spring tabs can be arranged in pairs, with each pair defining a preload force center. The preload force centers can be located midway between a radial width of the plate and equally spaced apart about the plate in a circumferential direction.

20 Claims, 2 Drawing Sheets

FOIL THRUST BEARING INCLUDING A FOLLOWER SPRING HAVING ROTATED, ELONGATED SPRING TABS

BACKGROUND OF THE INVENTION

The invention relates to bearings. More specifically, the invention relates to a foil thrust bearing including a follower spring.

Foil thrust bearings are very attractive for high speed turbomachines because they do not require oil-based lubrication and the maintenance demands of an oil-based lubrication system. Instead of using oil as a bearing lubricant, a foil thrust bearing uses a process fluid, such as air, methane, water, gaseous or liquid hydrogen, nitrogen or oxygen.

A turbomachine typically includes a rotor that is supported in an axial direction by at least one thrust bearing. A foil thrust bearing for the turbomachine is disposed between a stationary housing member and a rotational thrust runner. The foil thrust bearing includes a foil assembly including a backing plate and a circular array of circumferentially-extending foils carried by the backing plate. Additionally, the foil thrust bearing includes a spring assembly for providing compliant pressure axially to each overlying foil of the foil assembly. When the runner is rotated relative to the housing, a fluid film is generated between the foil assembly and the runner. At high rotational speeds, a pressure build-up within the fluid film supports the runner, while maintaining a separation between the runner and the foil assembly.

The rotor might have a certain amount of travel or free play in the axial direction. A large axial travel of the rotor might reduce or remove the compliant pressure placed on the foils by the spring assembly. Reducing or removing the compliant pressure would degrade the performance of the foil thrust bearing.

In such situations, the foil thrust bearing might be provided with a follower spring underlying the spring assembly. The follower spring pre-loads the spring assembly to ensure that compliant pressure is maintained on the foils throughout the axial travel of the rotor.

However, the follower spring adds overall size to the foil thrust bearing, increasing its thickness and radial cross-section. Increasing the size of the foil thrust bearing can be undesirable.

Moreover, there might be packaging constraints on the foil thrust bearing. Consequently, the follower spring might not size properly, particularly for foil thrust bearings that require small physical sizes and bearings that have larger sizes but require smaller radial widths. Additionally, the follower spring for such bearings might not be able to provide a proper axial preload. Performance of the foil thrust bearing would suffer.

SUMMARY OF THE INVENTION

The invention can be regarded as a foil thrust bearing that provides an improved combination of axial preload and small size. The foil thrust bearing assembly comprises a foil assembly including a foil; a spring assembly for applying compliant pressure to the foil; and a follower spring for applying a preload to the foil assembly and the spring assembly. The follower spring includes a plurality of elongated, spring tabs that are angularly offset at angles between approximately 45 degrees and approximately 75 degrees.

BRIEF DESCRIPTION OF THE DRAWING FIGURES

DETAILED DESCRIPTION OF THE INVENTION

Figure 1:
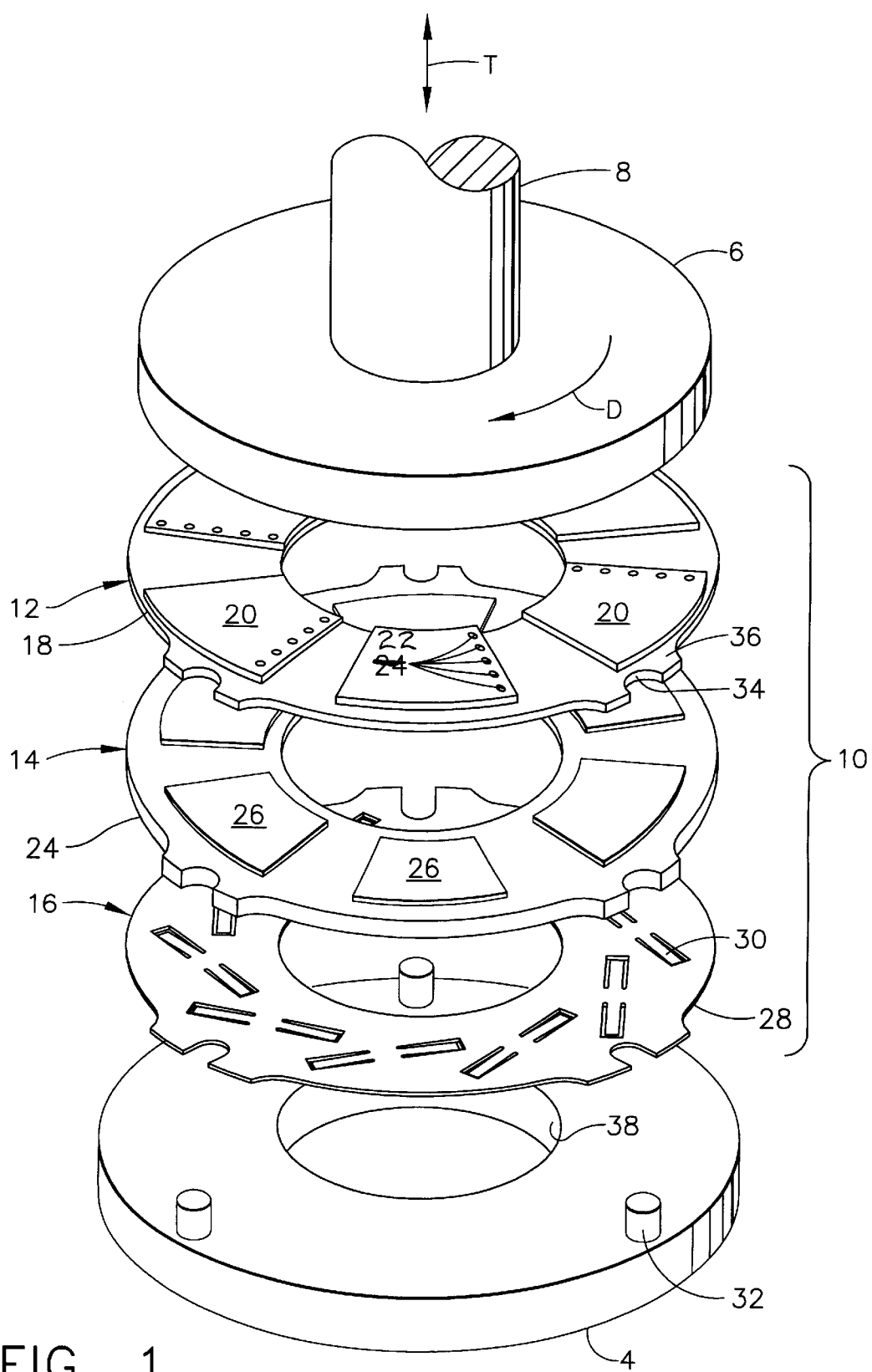
FIG. 1 is an exploded view of a foil thrust bearing according to the present invention.

FIG. 1 shows a foil thrust bearing 10 that disposed between a thrust plate 4 and a thrust runner 6. The thrust plate 4 is typically a non-rotational member such as a portion of a turbomachine housing. The thrust runner 6 is rotated by a shaft 8 in the direction shown by the arcuate arrow D. The foil thrust bearing 10 includes a foil assembly 12, a spring assembly 14, and a follower spring 16.

The foil assembly 12 includes a backing plate 18, and a plurality of thin, compliant foils 20. Each foil 20 is secured to the backing plate 18 along at least one generally radially extending side edge marginal portion by, for example, spot-welds 22 as shown in FIG. 1. Other securing expedients may be used to anchor the foils 20 to the backing plate 18. For example, the foils 20 may be brazed along their marginal side edge portions to the backing plate 18, or a portion of each foil 20 may be bent out of the plane of the foil 20 and received into a notch or groove defined by the backing plate 18. Construction of the foil assembly 12 is described in greater detail in U.S. Pat. No. 5,318,366, which is assigned to the assignee of the present invention.

The spring assembly 14 includes a stiffener disc 24 and a plurality of spring segments 26 anchored to the stiffener disc 24. Each spring segment 26 supports an overlying foil 20 to improve bearing load carrying capability. Generally, the number of spring segments 26 is equal to the number of foils 20. Six foils 20 and corresponding spring segments 26 are shown merely for exemplary purposes; the foil thrust bearing 10 could include one or more foils 20 and corresponding spring segments 26. The spring segments 26 can be secured to the stiffener disc 24 along one generally radially extending marginal side edge portion by spot welds or by one of the other securing expedients mentioned above.

Stiffness of the spring segments 26 can be controlled by corrugating portions of the spring segments 26 or by cutting out windows in portions of the spring segments 26. Depending upon the operating requirements for the foil thrust bearing 10, the stiffness of each spring segment 26 might be constant in the radial direction, or it might increase radially outwardly, or it might increase radially inward. The stiffness of the spring segments 26 might be constant or varying in the circumferential direction from their attachment to the stiffener disc 24 in the direction of rotation of shaft 12. An arrangement of spring segments 26 having stiffnesses that decrease radially inward is disclosed in U.S. Pat. No. 5,110,220, which is assigned to the assignee of the present invention. Such an arrangement tends to produce a relatively uniform film thickness and uniform support across the foils 20 in a radial direction. An arrangement of spring segments 26 having stiffnesses that vary in the circumferential direction and that decrease radially inward is disclosed in U.S. Pat. No. 5,318,366. Such an arrangement tends to produce an optimum film shape across the foil in the radial and circumferential directions for maximum load capacity.

The thrust runner 6 defines an axially-disposed face, which is confronted by the foils 20. The follower spring 16 preloads both the foil assembly 12 and the spring assembly 14 axially against the thrust runner 6. The follower spring 16 includes a plate 28 and spring tabs 30 integrally formed with the plate 28. The spring tabs 30 extend towards the thrust plate 4.

Carried by or in association with the thrust plate 4 is an array of anchoring pins 32. The anchoring pins 32 extend through notches 34 to engage projections 36 on the backing plate 18, the stiffener disc 24 and the follower spring plate 28. The anchoring pins 32 cooperatively prevent relative rotation between the foil assembly 12, the spring assembly 14, the follower spring 16, and the thrust plate 4. Through-openings 38 in the backing plate 18, the stiffener disc 24, the follower spring 16 and the thrust plate 4 allow the shaft 8 to pass through the foil thrust bearing 10. In the embodiment shown in FIG. 1, however, the shaft 8 does not pass through the through-openings 38. It will be understood that the shaft 8 might also be supported by radial bearings (not shown) so that the rotational axis of the shaft 8 is defined and certain.

In operation, the foil thrust bearing 10 uses a process fluid, such as air, methane, water, or gaseous or liquid hydrogen, nitrogen or oxygen in order to form a fluid dynamic film between the foil assembly 12 and the thrust runner 6. When the thrust runner 6 is rotated relative to the thrust plate 4, the fluid film is generated between the foil assembly 12 and the thrust runner 6. At high relative rotational speeds, pressure build-up within the fluid film supports the thrust runner 6, while maintaining a separation between the thrust runner 6 and the foil assembly 14. If the shaft 8 travels in the axial direction indicated by the linear arrow T, the follower spring 16 will ensure that the spring assembly 14 maintains the compliant pressure on the foils 20.

Figure 2:
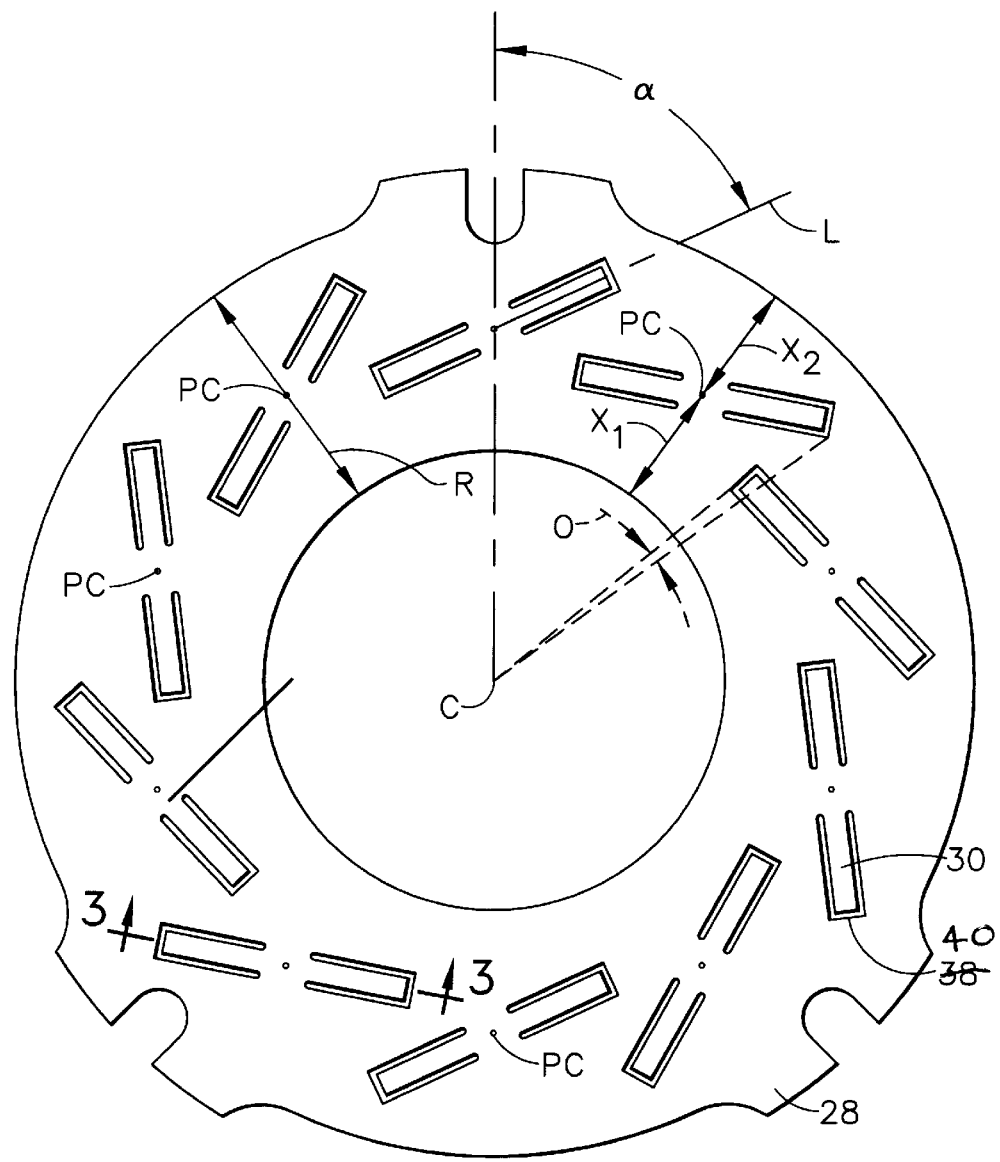
FIG. 2 is an axial view of a follower spring, which forms a part of the foil thrust bearing shown in FIG. 1.
Figure 3:
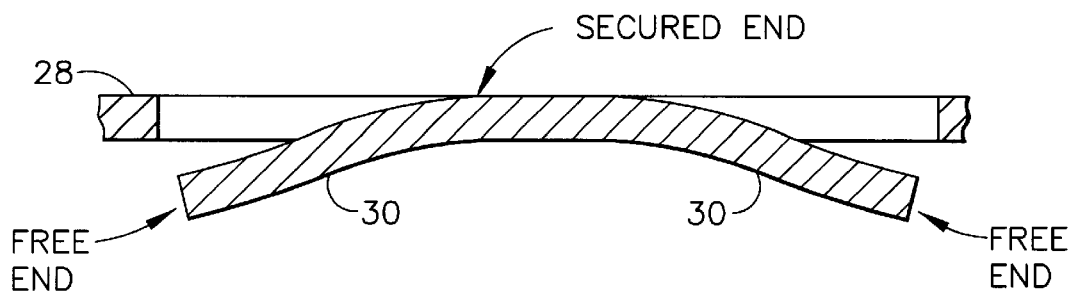
FIG. 3 is a cross-sectional view of a spring tab pair, which forms a part of the follower spring shown in FIG. 2.

Reference is now made to FIG. 2, which illustrates the follower spring 16 in greater detail. The follower plate has a radial width R. Formed in the follower spring plate 28 are a plurality of generally U-shaped elongated through slots 40. The elongated through slots 40 allow the spring tabs 30 to be cantilevered. Each spring tab 30 has a secured end that is secured to the follower spring plate 28 and a free end that is bent towards the thrust plate 4 (see FIG. 3). The flat part of the follower spring plate 28 bears against the stiffener disc 24 of the spring assembly 14, while the free ends of the spring tabs 30 bear against the thrust plate 4. The spring tabs 30 are angularly offset at angles between approximately 45 degrees and approximately 75 degrees. That is, the spring tabs 30 have longitudinal axes L that form angles α relative to imaginary radial lines I that extend through the center C of the follower spring plate 28. The angle α is in a range between approximately 45 degrees and approximately 75 degrees. An angle α of 65 degrees is preferred.

Rotating the spring tabs 30 allows the spring tabs 30 to be elongated. Elongating the spring tabs 30 allows the free ends to be bent further away from the follower spring plate 28. Consequently, the spring tabs 30 can accommodate greater travel of the thrust runner 6 in an axial direction T, which allows the follower spring 16 to maintain a proper preload on the foil assembly 12 and the spring assembly 14 over a greater distance of axial travel of the shaft 8.

Moreover, rotating and elongating the spring tabs 30 allows the same preload to be obtained in a smaller area or a larger preload to be obtained in the same area. Thus, the rotated, elongated spring tabs 30 allow the follower spring 16 to be made in relatively small sizes, or in larger sizes which have a minimal radial dimension, while still providing a combination of spring tab length, spring tab number, spring constant of the spring tabs 30, and range of possible motion for the free ends of the spring tabs 30, all of which are within desirable ranges for the foil thrust bearing 10. The radial size of the follower spring 16 may thus be reduced, or the foil thrust bearing 10 may be made in smaller overall sizes (or both) while still having desirable operating characteristics.

Rotating and elongating the spring tabs 30 also lowers the spring rate. Lowering the spring rate allows for a more consistent force to be applied by the spring tabs 30 over a greater axial distance.

The spring tabs 30 are arranged in pairs, with the spring tabs 30 of each pair extending in opposite directions. The spring tabs 30 of each pair have secured ends that oppose one another (see FIG. 3), and the spring tabs 30 of each pair are in alignment with one another. Each pair of spring tabs 30 cooperatively defines a preload force center, intermediate the secured ends of the spring tabs 30. The preload force center is indicated by an imaginary point PC. The preload force centers PC are spaced apart equally in a circumferential direction about the plate. Additionally, the preload force centers PC are located at radial positions midway between the radial width R of the plate 28. Thus, a distance X1 from the preload force center PC to a radially inner extent of the plate 28 is equal to a distance X2 from the preload force center PC to a radially outer extent of the plate 28. Distributing the preload force centers PC using pairs of spring tabs 30 as such provides a better preload distribution, which reduces rippling and warping of the follower spring plate 28 during operation of the foil thrust bearing 10.

As is illustrated by the dashed radial lines indicated with letter O, each circumferentially adjacent pair of spring tabs 30 is somewhat circumferentially overlapped with the circumferentially next-adjacent pair of spring tabs 30 by an angular distance. That is, each pair of spring tabs 30 has a radially outer spring tab and a radially inner spring tab. The radially outer spring tab 30 of each pair is circumferentially overlapped with the radially inner spring tab 30 of the circumferentially next-adjacent pair of spring beams. This arrangement of the pairs of spring tabs 30 allows a relatively larger number of spring tabs 30 to be formed in a follower spring 16 of a specific size. Consequently, it allows for a greater axial preload, a more uniform distribution of spring load circumferentially around the follower spring plate 28, and a reduced spring rate for the follower spring 16.

Thus disclosed in a foil thrust bearing 10 including a follower spring 16 providing an improved combination of preload, spring rate and size. The follower spring 16 can provide a higher preload to accommodate shaft motion over a greater distance, or it can provide an equivalent preload in a smaller package. The follower spring 16 provides a better distribution of preload force centers, thereby reducing rippling in the follower spring plate 28. Circumferential overlapping of the spring tabs 30 further improves axial preload and spring rate. Longer spring tabs 30 also result in lower stresses. The rotation of the spring tabs 30 as shown in FIG. 2 is believed to allow a desirable combination of spring tab length and number, which improves preload and spring rate (because a greater number of longer spring tabs can be formed on the plate 28), while allowing the radial dimension R of the follower spring 16 to be minimized.

The present invention is not limited to the specific embodiment described above. For example, the spring tabs 30 of each pair do not have to be rotated by the same angle. Instead, the spring tabs 30 of a pair can be rotated at different angles, with the preload force center being between the secured ends of the spring tabs. Choice of material for the follower spring 16 (e.g., Inconel), geometry of the spring tabs 30, how far the spring tabs 30 are bent, stiffness and size of the spring tabs 30 and other design parameters are dependant upon the length of travel of the runner plate 6 in the axial direction T, packaging constraints and other design considerations determined by the application for which the foil thrust bearing 10 is intended. Accordingly, the present invention is limited only by the claims that follow.

I claim:

1. A foil thrust bearing comprising:

a foil assembly including a foil;

a spring assembly for applying compliant pressure to the foil; and a follower spring for applying a preload to the foil assembly and the spring assembly, the follower spring including a plurality of elongated, spring tabs that are angularly offset an angles between approximately 45 degrees and approximately 75 degrees.

2. The foil thrust bearing of claim 1, wherein the spring tabs are angularly offset by approximately 65 degrees.

3. The foil thrust bearing of claim 1, wherein the follower spring further includes a follower spring plate, and wherein the spring tabs are integral with the plate.

4. The foil thrust bearing of claim 1, wherein the spring tabs are grouped in pairs.

5. The foil thrust bearing of claim 4, wherein each pair of spring tabs includes first and second spring tabs that are offset by the same angle.

6. The foil thrust bearing of claim 5, wherein each pair of spring tabs defines a preload force center between the secured ends of the first and second tabs.

7. The foil thrust bearing of claim 6, wherein the preload force centers are located at radial positions midway between a radially inner and radially outer extent of the plate.

8. The foil thrust bearing of claim 7, wherein the preload force centers are spaced apart equally in a circumferential direction on the plate.

9. The foil thrust bearing of claim 4, wherein at least some of the springs tabs are partially overlapping in a circumferential direction.

10. The foil thrust bearing of claim 4, wherein pairs of the spring tabs are at least partially overlapped in a circumferential direction.

11. A foil thrust bearing comprising:

a rotational thrust runner having an axial face;

a foil assembly having a plurality of thin compliant foils in confrontation with the axial face;

a spring assembly including a plurality of spring elements engaging the foil assembly and supporting the foils; and a follower spring including a plate and a plurality of pairs of oppositely extending, elongated spring tabs, both spring tabs of a pair being aligned along their respective lengths, each pair of spring tabs cooperatively defining a preload force center therebetween, the spring tabs having longitudinal axes that form angles relative to imaginary radial lines, the imaginary radial lines extending through a center of the plate, the angles being between a range of approximately 45 degrees and 75 degrees.

12. The foil thrust bearing of claim 11, wherein the angles are approximately 65 degrees.

13. The foil thrust bearing off claim 11, wherein each spring tab has a first end secured to the plate and a second end extending away from the plate, and wherein the spring tabs of each pair have opposing first ends, a preload force center being located between the opposing first ends.

14. The foil thrust bearing of claim 13, wherein the preload force centers are located at radial positions midway between a radial width of the plate.

15. The foil thrust bearing of claim 11, wherein each pair of spring tabs includes a radially inner spring tab and a radially outer spring tab, the radially inner and radially outer spring tabs of circumferentially adjacent pairs being cirumferentially overlapping.

16. A follower spring for a foil thrust bearing, the follower spring comprising:

a plate; and a plurality of pairs of elongated spring tabs, each spring tab having a first end secured to the plate and a free end extending from the plate, the spring tabs of each pair having opposing free ends, each pair of spring tabs cooperatively defining a preload force center, the spring tabs having longitudinal axes that form angles relative to imaginary radial lines, the imaginary radial lines extending through a center of the plate, the angles being between approximately 45 degrees and approximately 75 degrees.

17. The follower spring of claim 16, wherein the angles are approximately 65 degrees.

18. The follower spring of claim 16, wherein each pair of spring tabs includes a radially inner spring tab and a radially outer spring tab, the radially inner and radially outer spring tabs of circumferentially adjacent pairs being circumferentially overlapping.

19. The follower spring of claim 16, wherein each pair of spring tabs defines a preload force center between the secured ends, the preload force centers being located at radial positions midway between a radial width of the plate.

20. The follower spring of claim 19, wherein the preload force centers are spaced apart equally in a circumferential direction on the plate.

* * * * *